Feb. 24, 1931.  W. A. ROSENBERGER  1,793,871
SIDE LIGHT FOR AUTOMOBILES
Filed May 29, 1930   2 Sheets-Sheet 1

Inventor
William A. Rosenberger

By Clarence A. O'Brien
Attorney

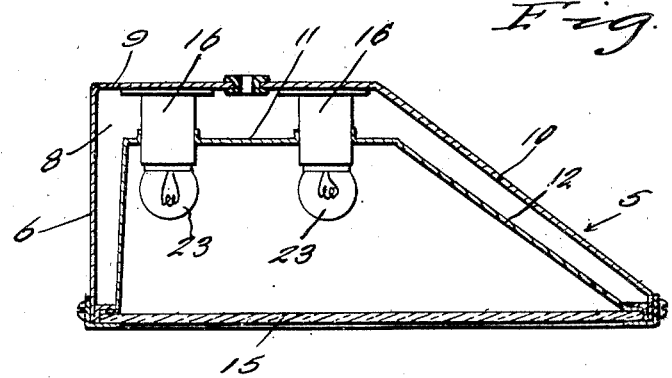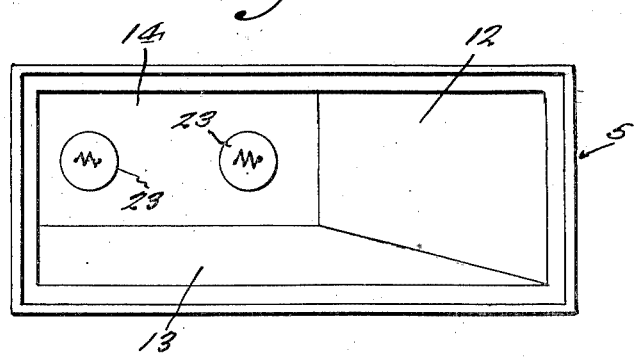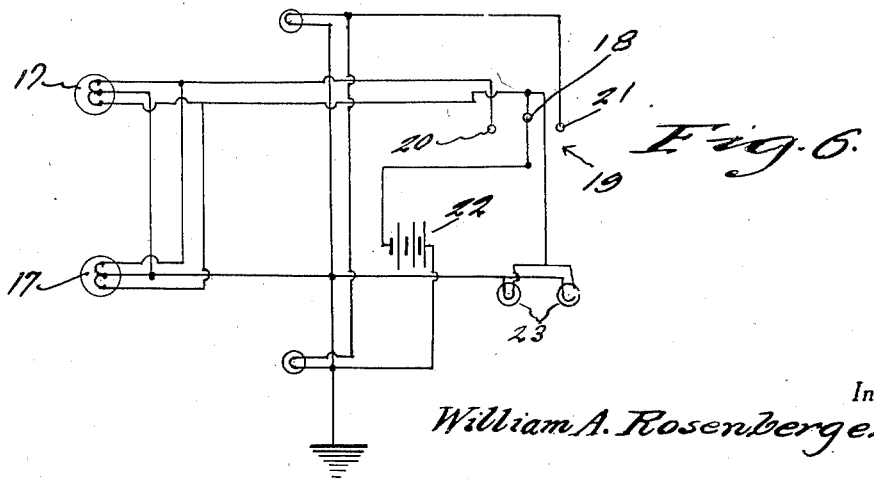

Patented Feb. 24, 1931

1,793,871

UNITED STATES PATENT OFFICE

WILLIAM A. ROSENBERGER, OF HAGERSTOWN, MARYLAND

SIDE LIGHT FOR AUTOMOBILES

Application filed May 29, 1930. Serial No. 457,237.

This invention relates to new and useful improvements in the class of inventions generally known as illumination.

The principal object of this invention is to provide a light for the sides of an automobile, positioned in such a manner as to illuminate the roadway toward one side of the automobile, thus eliminating all glare, either forward or rearward.

Another important object of the invention is to provide a light for the left side of an automobile, focused so as to flood the roadway on the left side of the automobile.

These and other objects of importance, and advantages of the invention will more readily become apparent to the reader after the invention is described hereinafter.

In the drawings:—

Fig. 4 is a horizontal sectional view through the light taken substantially on the line 4—4 of Fig. 2.

Fig. 5 represents a front elevational view of the lamp box.

Fig. 6 is a diagrammatic view disclosing the electrical connections between the electrical devices involved.

Figure 1:
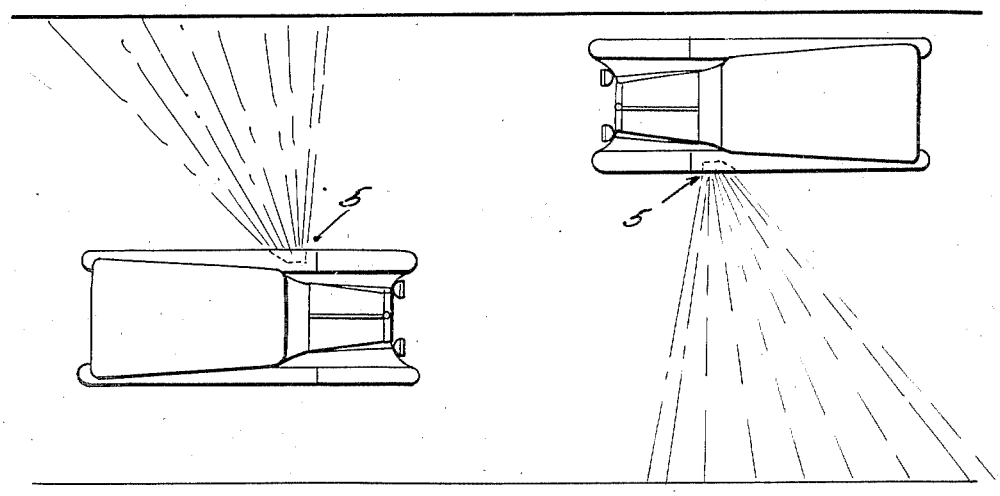
Figure 1 represents a plan view of a roadway showing two automobiles approaching each other and further showing the manner in which the roadway is illuminated at the left side of each vehicle.
Figure 2:
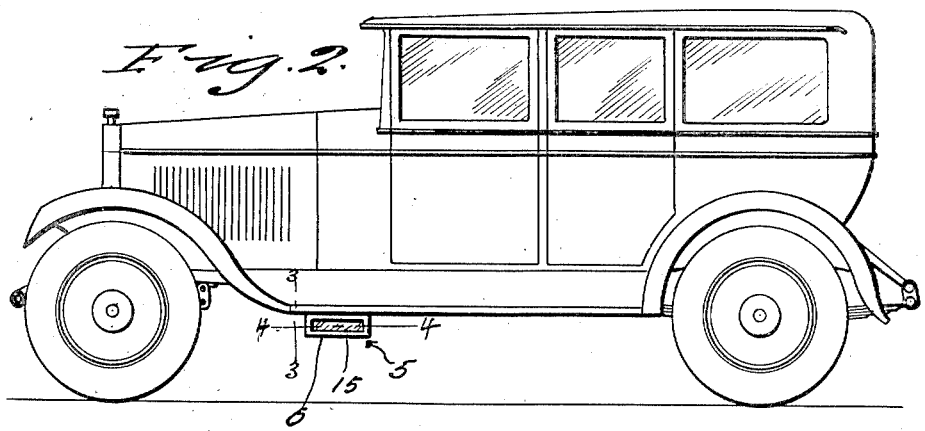
Fig. 2 represents a side elevational view of the left side of an automobile, equipped with the novel illuminating means.

Referring to the drawings wherein like numerals designate like parts, it can be seen that the novel light, which in the drawings, is generally referred to by numeral 5, is discretionarily mounted beneath the running board adjacent the front left fender.

It is to be understood that the light may be positioned at other places on the left side of the vehicle, without in any manner, departing from the spirit of this invention.

Figure 3:
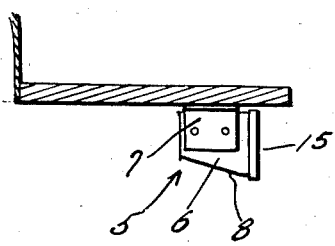
Fig. 3 represents a vertical sectional view, taken substantially on the line 3—3 of Fig. 2 and looking rearwardly.

As is shown in Fig. 3, the novel light structure includes a lamp box 6 which is supported by any suitable bracket means 7. As is apparent in Figs. 3 and 5, the bottom wall of the box, which is referred to by numeral 8, inclines backwardly toward the back wall, while one end portion of the lamp box 6 converges as at 10 toward the front of the box.

A reflector 11 is disposed within the lamp box 6 and is of substantially the same shape as the lamp box 6, but smaller somewhat, in every respect. The wall 12 converges toward the front of the reflector and assumes a position in the lamp box, substantially parallel to the wall 10, while the bottom wall 13 of the reflector is inclined backwardly toward its back wall 14 in substantially parallel relation to the bottom wall 8 of the lamp box.

A lens 15 is mounted within the open front of the box 6 and extends for the full length thereof. A pair of socket structures 16—16 project forwardly from the back wall 9 and project through openings in the back wall 14 of the reflector 11.

Fig. 6 shows the headlight bulbs 17—17 provided with the usual bright and dim filaments. The contact 18 of the switch generally referred to by numeral 19 is for the dim filaments, while the contact 20 is for the bright filaments.

The contact 18 is to be engaged by the movable element of the switch 19, so that current will flow from the battery 22 to the bulbs 23—23 in the sockets 16—16. Thus, the left side of the roadway will be flooded with light from the reflector of the lamp box, and because of the disposition of the wall 12 of the reflector, a substantial portion of the beam will be projected rearwardly.

While the foregoing specification sets forth the invention in detail, it is to be understood that numerous changes in the shape, size, wiring arrangement, and materials may be resorted to without departing from the spirit and scope of the invention as claimed hereinafter.

Having thus described my invention, what I claim as new is:—

1. A side light for automobiles comprising a lamp box and illuminating means within the lamp box whereby the roadway adjacent the automobile may be illuminated, said lamp box being provided with an internal reflector, said reflector being so reduced at one end as to project a substantial portion of the light ray rearwardly.

2. A safety light of the character described comprising a reflector, said reflector including a rear wall, a right angularly disposed end wall, and an outwardly obliquely disposed end wall opposed to the aforesaid end wall, and light ray projecting means in the reflector.

In testimony whereof I affix my signature.

WILLIAM A. ROSENBERGER.